(12) United States Patent
Kim (10) Patent No.: US 11,414,732 B2
(45) Date of Patent: Aug. 16, 2022

(54) FERRITIC STAINLESS STEEL FOR AUTOMOTIVE EXHAUST SYSTEM WITH IMPROVED HEAT RESISTANCE AND CONDENSATE CORROSION RESISTANCE, AND METHOD FOR MANUFACTURING THE SAME

(71) Applicant: POSCO, Pohang-si (KR)

(72) Inventor: Hyung Joon Kim, Pohang-si (KR)

(73) Assignee: POSCO, Pohang-si (KR)

( * ) Notice: Subject to any disclaimer, the term of this patent is extended or adjusted under 35 U.S.C. 154(b) by 142 days.

(21) Appl. No.: 16/468,878

(22) PCT Filed: Nov. 27, 2017

(86) PCT No.: PCT/KR2017/013589
§ 371 (c)(1),
(2) Date: Jun. 12, 2019

(87) PCT Pub. No.: WO2018/110858
PCT Pub. Date: Jun. 21, 2018

(65) Prior Publication Data
US 2020/0080174 A1   Mar. 12, 2020

(30) Foreign Application Priority Data

Dec. 13, 2016 (KR) .......... 10-2016-0169695

(51) Int. Cl.
*C22C 38/02* (2006.01)
*C21D 8/02* (2006.01)
(Continued)

(52) U.S. Cl.
CPC ............ *C22C 38/02* (2013.01); *C21D 8/0226* (2013.01); *C21D 8/0236* (2013.01);
(Continued)

(58) Field of Classification Search
CPC .... C22C 38/02; C21D 8/0226; C21D 8/0236; C21D 8/1277; C21D 9/0081; F01N 13/16
See application file for complete search history.

(56) References Cited

U.S. PATENT DOCUMENTS

2015/0345361 A1* 12/2015 Ryu ...................... C22C 38/001
428/653

FOREIGN PATENT DOCUMENTS

| CN | 102791899 A | 11/2015 |
| JP | 2001-288544 A | 10/2001 |

(Continued)

OTHER PUBLICATIONS

Yan, Heat treatment of Aluminum coating electrodeposited on ferritic stainless steel at room temperature molten salts, Oct. 2009, Transactions of Materials and Heat Treatment, p. 182-186 (Year: 2009).*

(Continued)

*Primary Examiner* — Nicholas A Wang
(74) *Attorney, Agent, or Firm* — Morgan, Lewis & Bockius LLP (57) ABSTRACT

Provided are a ferritic stainless steel for automotive exhaust systems with improved heat resistance and condensate corrosion resistance and a method for manufacturing the same. The ferritic stainless steel according to an exemplary embodiment of the present invention includes a stainless steel base material comprising, in % by weight, C: 0.01% or less, Si: 0.5 to 1.0%, Mn: 0.5% or less, P: 0.035% or less, S: 0.01% or less, Cr: 11 to 18%, N: 0.013% or less, Ti: 0.15 to 0.5%, Sn: 0.03 to 0.5%, and the remainder of Fe and other inevitable impurities, and an Al-plated layer formed on the stainless steel base material, wherein the ferritic stainless steel comprises a plating compound comprising $(Al_{19}FeMnSi_2)_{5.31}$ (Aluminum Iron Manganese Silicide) at (Continued)

an interface between the stainless steel base material and the Al-plated layer.

7 Claims, 8 Drawing Sheets

(51) Int. Cl.
- C21D 8/12 (2006.01)
- C21D 9/00 (2006.01)
- F01N 13/16 (2010.01)

(52) U.S. Cl.
CPC ......... C21D 8/1277 (2013.01); C21D 9/0081 (2013.01); F01N 13/16 (2013.01)

(56) References Cited

FOREIGN PATENT DOCUMENTS

| | | | |
|---|---|---|---|
| JP | 2014-152368 A | | 8/2014 |
| KR | 10-2008-0110662 A | | 12/2008 |
| KR | 10-2012-0063793 A | | 6/2012 |
| KR | 10-2013-0074220 A | | 7/2013 |
| KR | 20130074220 A | * | 7/2013 |
| KR | 10-2014-0083726 A | | 7/2014 |
| KR | 20140083726 A | * | 7/2014 |

OTHER PUBLICATIONS

Kral, Electron Microscope Studies of Al-Fe-Si Intermetallics in an Al-11 PCT Si Alloy, Jun. 2006, Metallurgical and Materials Transactions A, vol. 37A, p. 1 (Year: 2006).*
Canadian Office Action dated Sep. 11, 2020 issued in Canadian Patent Application No. 3,046,945.
Chinese Office Action dated Jul. 3, 2020 issued in Chinese Patent Application No. 201780077234.8 (with English Abstract).
Li Yan, et al., "Heat treatment of aluminum coating electrodeposited on ferritic stainless steel at room temperature molten salts," Transactions of Materials and Heat Treatment, vol. 30, No. 5, 2009, pp. 182-186 (partial English translation).
Second Canadian Office Action dated Feb. 11, 2021 issued in Canadian Patent Application No. 3,046,945.
Chinese Office Action dated Apr. 6, 2021 issued in Chinese Patent Application No. 201780077234.8 (with English translation).
Ndian Office Action dated Apr. 2, 2021 issued in Indian Patent Application No. 201917023249 (with English translation).
International Search Report issued in corresponding International Application No. PCT/KR2017/013589, dated Mar. 2, 2018.
Vietnamese Office Action dated May 30, 2022 issued in Vietnamese Patent Application No. 1-2019-03144 (with English translation).

* cited by examiner

FERRITIC STAINLESS STEEL FOR AUTOMOTIVE EXHAUST SYSTEM WITH IMPROVED HEAT RESISTANCE AND CONDENSATE CORROSION RESISTANCE, AND METHOD FOR MANUFACTURING THE SAME

CROSS-REFERENCE OF RELATED APPLICATIONS

This application is the U.S. National Phase under 35 U.S.C. § 371 of International Patent Application No. PCT/KR2017/013589, filed on Nov. 27, 2017, which in turn claims the benefit of Korean Patent Application No. 10-2016-0169695, filed Dec. 13, 2016, the entire disclosures of which applications are incorporated by reference herein.

TECHNICAL FIELD

The present invention relates to a ferritic stainless steel and a method for manufacturing the same, and more particularly, a ferritic stainless steel for automotive exhaust systems with improved heat resistance and condensate corrosion resistance and a method for manufacturing the same in order to satisfy characteristics required for the automotive exhaust systems.

BACKGROUND ART

A cold-rolled stainless steel product, particularly a cold-rolled ferritic stainless steel product, has excellent high temperature properties such as a thermal expansion rate, a thermal fatigue property, etc., and is resistant to stress corrosion cracking. Therefore, the ferritic stainless steel has been widely used in parts for automotive exhaust systems, home apparatuses, structures, home appliances, elevators, etc.

Generally, members of the automotive exhaust systems are classified into hot parts and cold parts according to the temperature of an exhaust gas. The hot parts of an automobile include an exhaust manifold, a converter, and a bellows, and such parts are generally used at 600° C. or above and have excellent high temperature strength, thermal fatigue and salt corrosion properties. On the other hand, the cold parts are members that are used at approximately 400° C., and include a muffler which reduces noise caused by an automotive exhaust gas. Due to a condensate corrosion property caused by a sulfur (S) component in automotive fuel and an external surface rusting corrosion property caused by the use of deicing salt in the winter, materials such as stainless (or STS) 409, 409L, 439, 436L and Al-plated stainless 409 have been used in the cold parts of the automotive exhaust systems.

For example, STS 409L, the cheapest material among stainless steels, is a type of steel which includes approximately 11 wt % Cr and in which C and N are stabilized by Ti, thereby preventing sensitivity of a welded area and exhibiting excellent processability, is generally used at 700° C. or below, and has some resistance to corrosion caused by a condensate component generated in the automotive exhaust systems, and thus has been most widely used.

In a corrosive environment requiring high corrosion resistance, STS 439 steels containing 17 wt % Cr, and STS 436L steel containing approximately 1 wt % Mo as well as STS 439 steel have been used, but there is a problem of increased cost for parts.

Recently, in countries such as China and India, and in Latin American countries, in which automobile production and penetration rate is drastically increasing in contrast to other developed countries, the sulfur (S) content in gasoline is considerably high. For example, Korea and Japan regulate the sulfur (S) content in gasoline to be below 10 ppm, and China regulates the sulfur (S) content to be below 500 ppm, but gasoline in China actually contains a sulfur content higher than 500 ppm according to region.

The sulfur (S) content in gasoline is concentrated by a sulfate ion ($SO_4^{2-}$) of a condensate component in automobile exhaust gas, and a sulfate ($H_2SO_4$) atmosphere with a high corrosive property of pH 2 or less is created. For this reason, corrosion resistance may not be ensured with conventional STS 409L, and thus high chromium-based stainless materials containing 17 wt % or more of a Cr component or Mo, such as STS 439 and 436L, are gradually being used. However, since there is a problem in that the resource price of the material gradually increases, there is a demand for the development of a stainless material having pitting corrosion resistance and condensate corrosion resistance, which does not contain high priced elements such as Cr or Mo, or only contains a very small amount of those elements.

(Patent Document 0001) Korean Unexamined Patent Application Publication No. 10-2008-0110662

DISCLOSURE

Technical Problem

The present invention is directed to providing a ferritic stainless steel for an automotive exhaust system to satisfy properties required for the automotive exhaust system, such as heat resistance and corrosion resistance in a condensate atmosphere by containing Sn in the ferritic stainless steel for the automotive exhaust system, allowing Sn to be concentrated at the surface area of the stainless steel and forming an Al-plated layer on a base material to form a plating compound at an interface between the base material and the plated layer.

The present invention is also directed to providing a method for manufacturing the ferritic stainless steel for the automotive exhaust system.

Technical Solution

A ferritic stainless steel according to an exemplary embodiment of the present invention includes a stainless steel base material comprising, in % by weight, C: 0.01% or less, Si: 0.5 to 1.0%, Mn: 0.5% or less, P: 0.035% or less, S: 0.01% or less, Cr: 11 to 18%, N: 0.013% or less, Ti: 0.15 to 0.5%, Sn: 0.03 to 0.5%, and the remainder of Fe and other inevitable impurities, and an Al-plated layer formed on the stainless steel base material, wherein the ferritic stainless steel comprises a plating compound comprising $(Al_{19}FeMnSi_2)_{5.31}$ (Aluminum Iron Manganese Silicide) at an interface between the stainless steel base material and the Al-plated layer.

In addition, according to an exemplary embodiment of the present invention, the plating compound may further include at least one selected from a group consisting of $Al_9FeSi_2$ (Aluminum Iron Silicon), $Al_3FeSi_2$ (Aluminum Iron Silicon), and Al (Aluminum).

In addition, according to an exemplary embodiment of the present invention, Sn may be concentrated on a surface of the stainless steel base material adjacent to the Al-plated layer by 4.5 times or more as compared to the stainless steel base material.

In addition, according to an exemplary embodiment of the present invention, Sn may be concentrated on the surface of the stainless steel base material by 4.5 to 6.1 times as compared to the stainless steel base material.

In addition, according to an exemplary embodiment of the present invention, the ferritic stainless steel may include Sn: 0.05 to 0.5%.

In addition, according to an exemplary embodiment of the present invention, the ferritic stainless steel may have a maximum pitting corrosion depth of less than 0.4 mm in the evaluation of condensate corrosion characteristics (JASO-B M611-92).

In addition, according to an exemplary embodiment of the present invention, a chrominance ($\Delta E$) of a surface of the stainless steel before and after a heat treatment is 10 or less.

A method for manufacturing a ferritic stainless steel according to an exemplary embodiment of the present invention includes hot-rolling a ferritic stainless steel slab comprising, in % by weight, C: 0.01% or less, Si: 0.5 to 1.0%, Mn: 0.5% or less, P: 0.035% or less, S: 0.01% or less, Cr: 11 to 18%, N: 0.013% or less, Ti: 0.15 to 0.5%, Sn: 0.03 to 0.5%, and the remainder of Fe and other inevitable impurities; cold-rolling a hot-rolled steel plate; and aluminum-plating a cold-rolled steel plate.

In addition, according to an exemplary embodiment of the present invention, the ferritic stainless steel is manufactured by a conventional STS 409L manufacturing process.

In addition, according to an exemplary embodiment of the present invention, the method may further include heat-treating the aluminum-plated ferritic stainless steel at a temperature of 300 to 500° C. within 48 hours, wherein a chrominance ($\Delta E$) of a surface of the stainless steel before and after the heat treatment is 10 or less.

Advantageous Effects

According to exemplary embodiments of the present invention, a ferritic stainless steel having excellent pitting corrosion resistance and condensate corrosion resistance without an increase in production cost and without a decrease in processability may be manufactured by adding approximately 0.05 wt % or more of Sn to a pre-existing 11Cr stainless steel such as STS 409 among conventional ferritic stainless steels.

In addition, when the ferritic stainless steel according to exemplary embodiments of the present invention is used in the end part of an exhaust system, for example, in a muffler-related material for an automotive exhaust system, a member of the automotive exhaust system, which ensures excellent corrosion resistance, without an increase in production cost in regions such as China, which uses conventional high sulfur fuel, may be manufactured.

MODES OF THE INVENTION

A ferritic stainless steel for automotive exhaust systems with improved heat resistance and condensate corrosion resistance according to an exemplary embodiment of the present invention includes a stainless steel base material comprising, in % by weight, C: 0.01% or less, Si: 0.5 to 1.0%, Mn: 0.5% or less, P: 0.035% or less, S: 0.01% or less, Cr: 11 to 18%, N: 0.013% or less, Ti: 0.15 to 0.5%, Sn: 0.03 to 0.5%, and the remainder of Fe and other inevitable impurities, and an Al-plated layer formed on the stainless steel base material, wherein the ferritic stainless steel comprises a plating compound comprising $(Al_{19}FeMnSi_2)_{5.31}$ (Aluminum Iron Manganese Silicide) at an interface between the stainless steel base material and the Al-plated layer.

Hereinafter, exemplary embodiments of the present invention will be described in detail with reference to accompanying drawings. The following examples are provided to fully deliver the spirit of the present invention to those of ordinary skill in the art. The present invention may be specified in different forms without limitation to examples, which will not be described herein. To clarify the present invention, illustration of parts that are not associated with the explanation will be omitted, and to help in understanding, the sizes of components will be slightly exaggerated.

The ferritic stainless steel for automotive exhaust systems according to an exemplary embodiment of the present invention comprises, in % by weight, C: 0.01% or less, Si: 0.5 to 1.0%, Mn: 0.5% or less, P: 0.035% or less, S: 0.01% or less, Cr: 11 to 18%, N: 0.013% or less, Ti: 0.15 to 0.5%, Sn: 0.03 to 0.5%, and the remainder of Fe and other inevitable impurities.

In the case of C and N being present in an interstitial form as Ti(C, N) carbonitride-forming elements, Ti(C, N) carbonitride is not formed when C and N contents are high, and C and N present at a high concentration deteriorate elongation and low-temperature impact properties of the material. When the material is used at 600° C. or below for a long period of time after welding, intergranular corrosion occurs due to generation of $Cr_{23}C_6$ carbide, and therefore the content of C is preferably controlled to be 0.01 wt % or less, and the content of N is preferably controlled to be 0.01 wt % or less.

Moreover, when the C+N content is high, a number of surface defects such as scabs may occur due to an increase in steelmaking inclusions caused by adding a high content of Ti, a nozzle blocking phenomenon occurs in a continuous casting process, and elongation impact properties are degraded due to an increase in the high contents of C and N. For this reason, the C+N content is preferably controlled to be 0.02 wt % or less.

Si is an element added as a deoxidizing element, and when its content is increased as a ferrite-phase forming element, ferrite-phase stability is increased. When the Si content is increased, a pitting corrosion potential is increased, and oxidation resistance is increased. In the present invention, for the purpose of improvement in pitting corrosion potential and oxidation resistance, at least 0.5 wt % or more of Si is preferably contained. If the Si content is increased to 1.0 wt % or more, steelmaking Si inclusions are increased and surface defects occur. For this reason, the Si content is preferably controlled not to exceed 1.0 wt % or more.

When the Mn content is increased, pitting corrosion resistance is decreased by the formation of a precipitate such as MnS. However, excessive Mn reduction leads to an increase in refining cost, and therefore, the Mn content is preferably controlled to be 0.5 wt % or less.

Since P and S form grain boundary segregation and an MnS precipitate, leading to degradation in hot workability, it is preferable that a small amount of P and S are present. However, since excessive reduction leads to an increase in refining cost, P is preferably controlled to be 0.035 wt % or less, and S is preferably controlled to be 0.01 wt % or less.

Cr is an essential element for ensuring corrosion resistance of a stainless steel. When the Cr content is low, corrosion resistance is degraded in a condensate atmosphere, and when the Cr content is too high, corrosion resistance is improved, but due to high strength, degradation in elongation and impact properties, and an increase in production cost, the Cr content is preferably controlled to be 10 to 18 wt %.

Ti is an effective element that fixes C and N to prevent intergranular corrosion. However, when a Ti/(C+N) ratio is decreased, due to intergranular corrosion occurring at welded areas, corrosion resistance is decreased, and therefore Ti is preferably controlled to be at least 0.15 wt % or more. However, when the Ti content is too high, steelmaking inclusions are increased, a number of surface defects such as scabs may occur due to an increase in steelmaking inclusions, a nozzle blocking phenomenon occurs in a continuous casting process, and elongation and impact properties are degraded. For this reason, the Ti content is preferably controlled to be 0.5 wt % or less.

Sn is an essential element to ensure heat resistance and corrosion resistance in a condensate atmosphere, for which the present invention aims.

In the present invention, to ensure heat resistance and condensate corrosion resistance, Sn is preferably controlled to be at least 0.03 wt % or more. However, since excessive addition of Sn leads to degradation of the manufacturing process, the Sn content is preferably controlled to be 0.5 wt %. More preferably, the Sn content is controlled to be 0.05 to 0.5 wt %. The ferritic stainless steel according to one embodiment of the present invention may be an Al-plated ferritic stainless steel, which includes a stainless steel base material and an Al-plated layer formed on the stainless steel base material.

The ferritic stainless steel according to an embodiment of the present invention includes $(Al_{19}FeMnSi_2)_{5.31}$ (Aluminum Iron Manganese Silicide) as a plating compound at the interface between the stainless steel base material and the Al-plated layer.

The ferritic stainless steel according to an embodiment of the present invention does not include $Al_{17}(Fe_{32}Mn_{0.8})Si_2$ (Aluminum Iron Manganese Silicon) as a plating compound at the interface between the stainless steel base material and the Al-plated layer. This is a plating compound to be formed on Sn-free Al-plated stainless steel, that is, the composition of the plating compound formed on the interface between the stainless steel base material and the Al-plated layer differs depending on whether Sn is added or not.

For example, the plating compound may further include at least one selected from a group consisting of $Al_9FeSi_2$ (Aluminum Iron Silicon), $Al_3FeSi_2$ (Aluminum Iron Silicon), Al (Aluminum).

In the ferritic stainless steel according to the embodiment of the present invention, Sn is concentrated on a surface of the stainless steel base material adjacent to the Al-plated layer by 4.5 times or more as compared with the stainless steel base material. Sn is relatively strong in oxygen affinity compared with other elements, and may be concentrated on the surface of the stainless steel on which the oxidation scale is formed.

For example, the Sn may be concentrated on the surface of the stainless steel base material by 4.5 to 6.1 times as compared to the stainless steel base material.

The stainless steel not only includes a region where Sn is concentrated on the surface but also includes $(Al_{19}FeMnSi_2)_{5.31}$ (Aluminum Iron Manganese Silicide) as a plating compound at the interface between the stainless steel base material and the Al-plated layer, accordingly the desired improved heat resistance and condensate corrosion resistance may be obtained as compared with the ferritic stainless steels which do not contain Sn or in which Sn is not concentrated on the surface.

Figure 1:
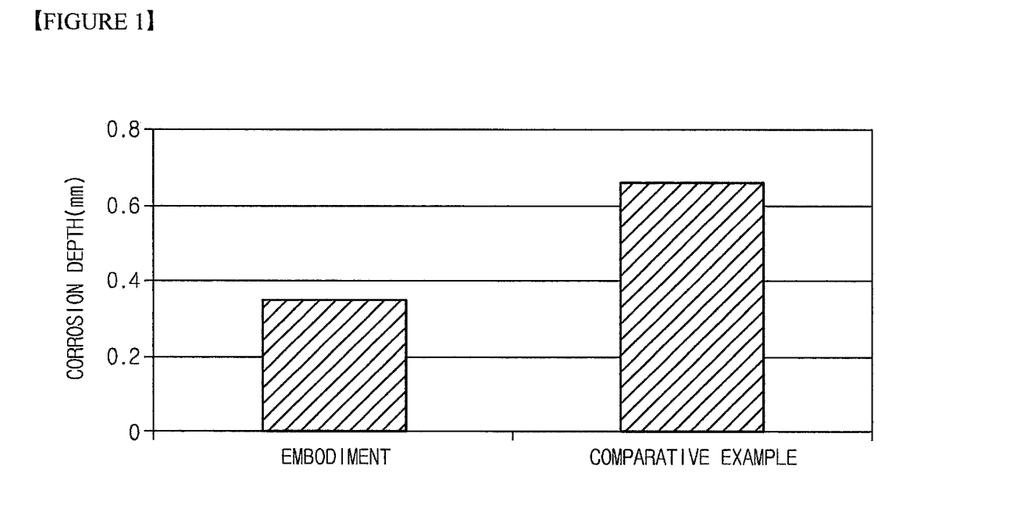
FIG. 1 is a graph showing a maximum pitting corrosion depth of a Sn-added stainless steel of the present invention and a Sn-free stainless steel in a condensate solution of an automotive exhaust system.

FIG. 1 is a graph showing a maximum pitting corrosion depth of a Sn-added stainless steel of the present invention and a Sn-free stainless steel in a condensate solution of an automotive exhaust system.

The embodiment of FIG. 1 is a ferritic stainless steel to which Sn is added according to an embodiment of the present invention, and a comparative example shows the maximum pitting corrosion depth after the evaluation of condensate corrosion characteristics (JASO-B M611-92) of a conventional Al-coated 409L steel.

For example, the ferritic stainless steel according to one embodiment of the present invention may have the maximum pitting corrosion depth of less than 0.4 mm when evaluating the condensate corrosion characteristics (JASO-B M611-92). In contrast, conventional Al-coated 409L steels exhibit the maximum pitting corrosion depth of greater than about 0.6 mm.

For example, the ferritic stainless steel according to one embodiment of the present invention may have a chrominance (ΔE) of the surface of the stainless steel before and after a heat treatment of 10 or less.

The method for manufacturing the ferritic stainless steel according to one embodiment of the present invention may include subjecting a ferritic stainless steel slab containing the above composition to hot-rolling, hot annealing, hot pickling, cold-rolling and finishing annealing. This manufacturing process may be a conventional STS 409L manufacturing process. Thereafter, the cold-rolled steel sheet may be subjected to an aluminum plating process to produce an Al-coated ferrite stainless steel.

For example, the method for manufacturing the ferritic stainless steel according to an embodiment of the present invention may further include heat-treating the Al-coated ferritic stainless steel at a temperature of 300 to 500° C. within 48 hours, and the chrominance (ΔE) of the surface of the stainless steel before and after the heat treatment is 10 or less.

Hereinafter, the ferritic stainless steel for an automotive exhaust system according to an exemplary embodiment of the present invention is described in further detail with reference to examples.

EXAMPLES

Inventive Steel 1

A ferritic stainless steel slab was prepared having the composition shown in Table 1 below. The slab was hot-rolled at a temperature of 1,150° C. to prepare a hot-rolled steel plate having a thickness of 3.0 mm. The hot-rolled steel plate was annealed, pickled and cold-rolled to produce a cold-rolled steel plate having a thickness of 1.2 mm, followed by finish annealing and pickling, and then subjected to Al plating to produce a final Al-plated ferritic stainless steel product.

Inventive Steel 2

A ferritic stainless steel product was manufactured by the same method as that described for Inventive Steel 1, except that the composition of Inventive Steel 2 shown in Table 1 below was used.

Inventive Steel 3

A ferritic stainless steel product was manufactured by the same method as that described for Inventive Steel 1, except that the composition of Inventive Steel 3 shown in Table 1 below was used.

Comparative Steel 1

A ferritic stainless steel product was manufactured by the same method as that described for Inventive Steel 1, except that the composition of Comparative Steel 1 shown in Table 1 below was used.

Comparative Steel 2

A ferritic stainless steel product was manufactured by the same method as that described for Inventive Steel 1, except that the composition of Comparative Steel 2 shown in Table 1 below was used.

TABLE 1

| Classification | C | Si | Mn | P | S | Cr | Ti | Sb | N | Ti/(C + N) |
|---|---|---|---|---|---|---|---|---|---|---|
| Inventive Steel 1 | 0.005 | 0.597 | 0.30 | 0.021 | <0.003 | 11.14 | 0.22 | 0.048 | 0.0074 | 17.4 |
| Inventive Steel 2 | 0.005 | 0.613 | 0.31 | 0.023 | <0.003 | 11.21 | 0.21 | 0.11 | 0.0089 | 15.1 |
| Inventive Steel 3 | 0.006 | 0.592 | 0.30 | 0.019 | <0.003 | 11.24 | 0.24 | 0.2 | 0.0072 | 18.2 |
| Comparative Steel 1 | 0.005 | 0.62 | 0.30 | 0.023 | <0.003 | 11.24 | 0.22 | 0 | 0.0074 | 17.7 |
| Comparative Steel 2 | 0.006 | 0.594 | 0.30 | 0.020 | <0.003 | 11.29 | 0.23 | 0.02 | 0.0072 | 18.8 |

Table 2 shows the results of measurement of main components in the concentrated layer of the surface of the stainless steel base material adjacent to the stainless steel base material and the aluminum plating layer of Inventive Steel 3 above.

TABLE 2

| | Concentrated layer 1 (wt %) | Concentrated layer 2 (wt %) | Concentrated layer 3 (wt %) | Base material (wt %) |
|---|---|---|---|---|
| Fe | 79.11074 | 83.80825 | 82.11589 | 88.5022 |
| Cr | 11.32846 | 9.647609 | 10.79504 | 10.30857 |
| Al | 6.784723 | 4.033176 | 4.799919 | 0.157073 |
| Si | 1.798595 | 1.204887 | 1.276994 | 0.781254 |
| Sn | 0.977485 | 1.306278 | 1.012158 | 0.214902 |
| Concentrated layer Sn/Base material Sn | 4.5 | 6.1 | 4.7 | — |

Figure 2:
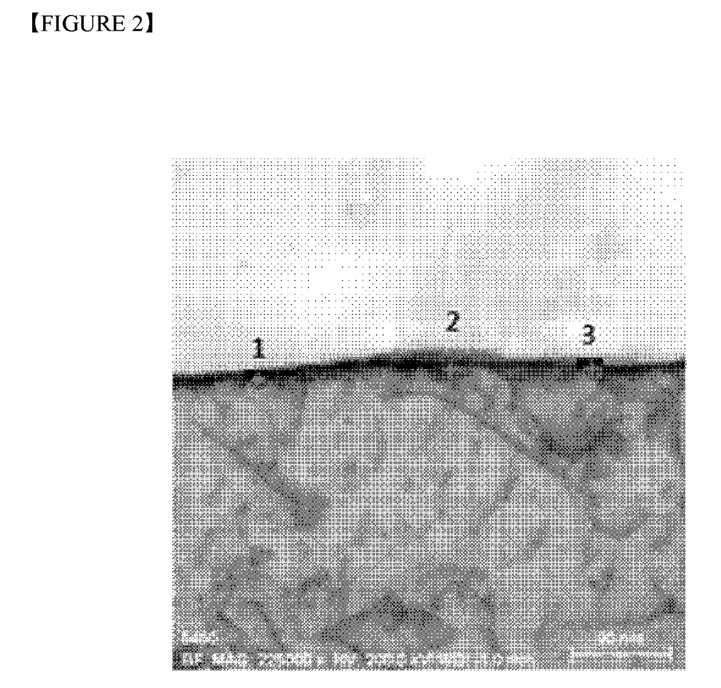
FIG. 2 is a drawing showing the results of analysis of an interface between an Al-plated layer of the Sn-added stainless steel of the present invention and a stainless steel base material by transmission electron microscopy (TEM) and EDS (Energy-Dispersive Spectroscopy).

FIG. 2 is a drawing showing the results of analysis of an interface between an Al-plated layer of the Sn-added stainless steel of the present invention and a stainless steel base material by transmission electron microscopy (TEM) and EDS (Energy-Dispersive Spectroscopy).

Referring to FIG. 2 and Table 2, in the ferritic stainless steel according to the embodiment of the present invention, Sn is concentrated on the surface of the stainless steel base material adjacent to the Al-plated layer by 4.5 to 6.1 times as compared to the stainless steel base material.

Figure 3:
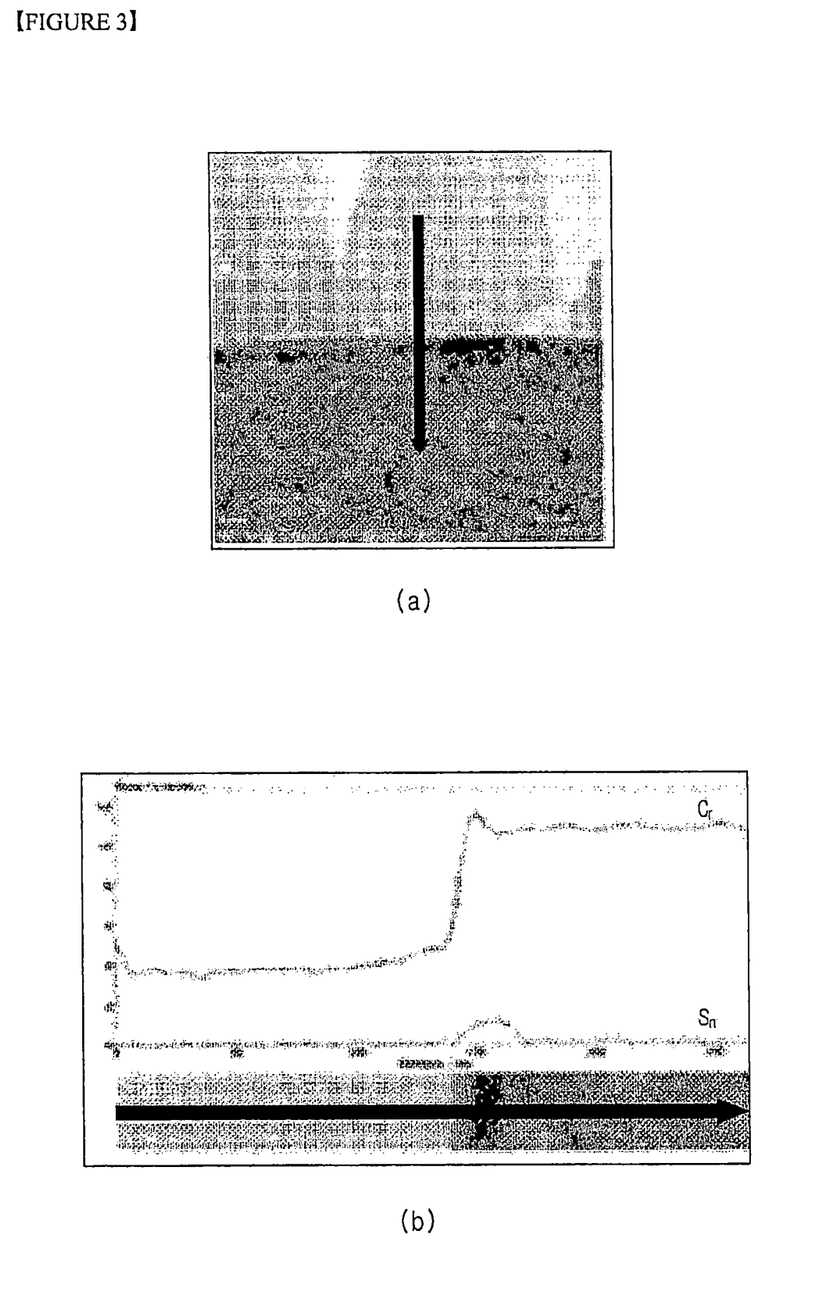
FIG. 3 is a drawing showing the results of line analysis by transmission electron microscopy (TEM) and EDS (Energy-Dispersive Spectroscopy) from the Al-plated layer of the Sn-added stainless steel of the present invention to a base material.
Figure 4:
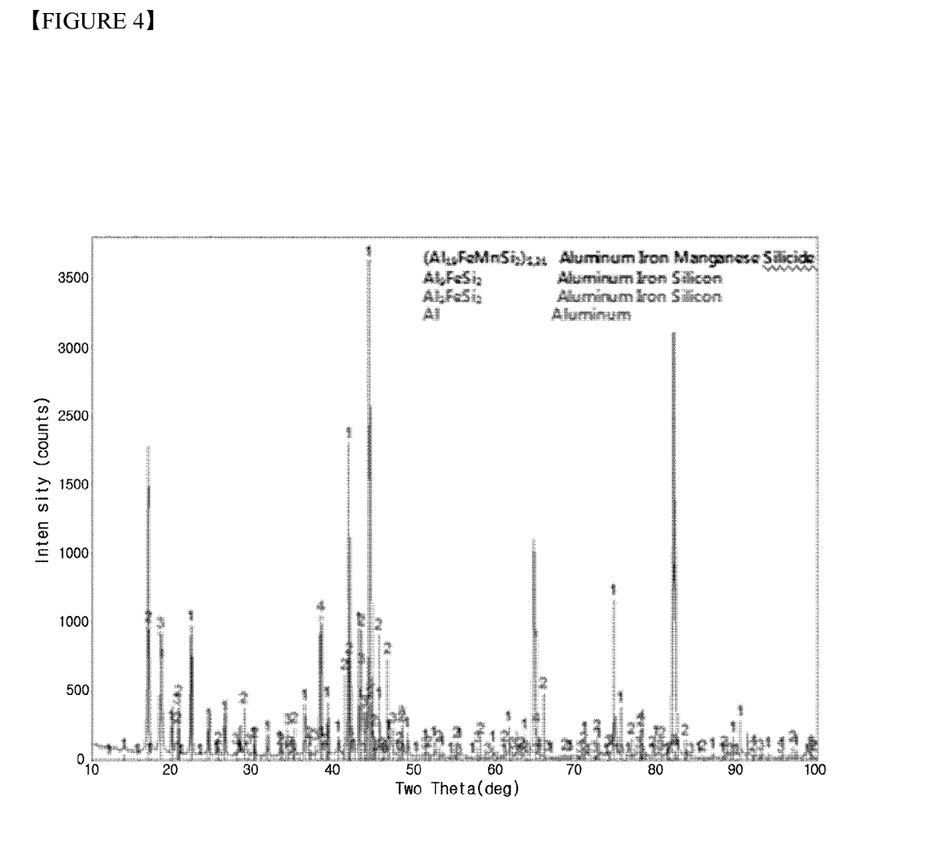
FIG. 4 is a graph showing the results of X-ray diffraction (XRD) analysis of the interface between the Al-plated layer of the Sn-added stainless steel of the present invention and the stainless steel base material.

FIG. 3 is a drawing showing the results of line analysis by transmission electron microscopy (TEM) and EDS (Energy-Dispersive Spectroscopy) from the Al-plated layer of the Sn-added stainless steel of the present invention to a base material. FIG. 4 is a graph showing the results of X-ray diffraction (XRD) analysis of the interface between Al-plated layer of the Sn-added stainless steel of the present invention and the stainless steel base material.

Referring to FIG. 3, when Cr and Sn were measured from the plated layer toward the base material, it was confirmed that Sn was concentrated on the surface of the stainless steel base material adjacent to the Al-plated layer.

Referring to FIG. 4, the ferritic stainless steel comprises a plating compound comprising $(Al_{19}FeMnSi_2)_{5.31}$ (Aluminum Iron Manganese Silicide), $Al_9FeSi_2$ (Aluminum Iron Silicon), $Al_3FeSi_2$ (Aluminum Iron Silicon), and Al (Aluminum) at the interface between the stainless steel base material and the Al-plated layer.

Figure 5:
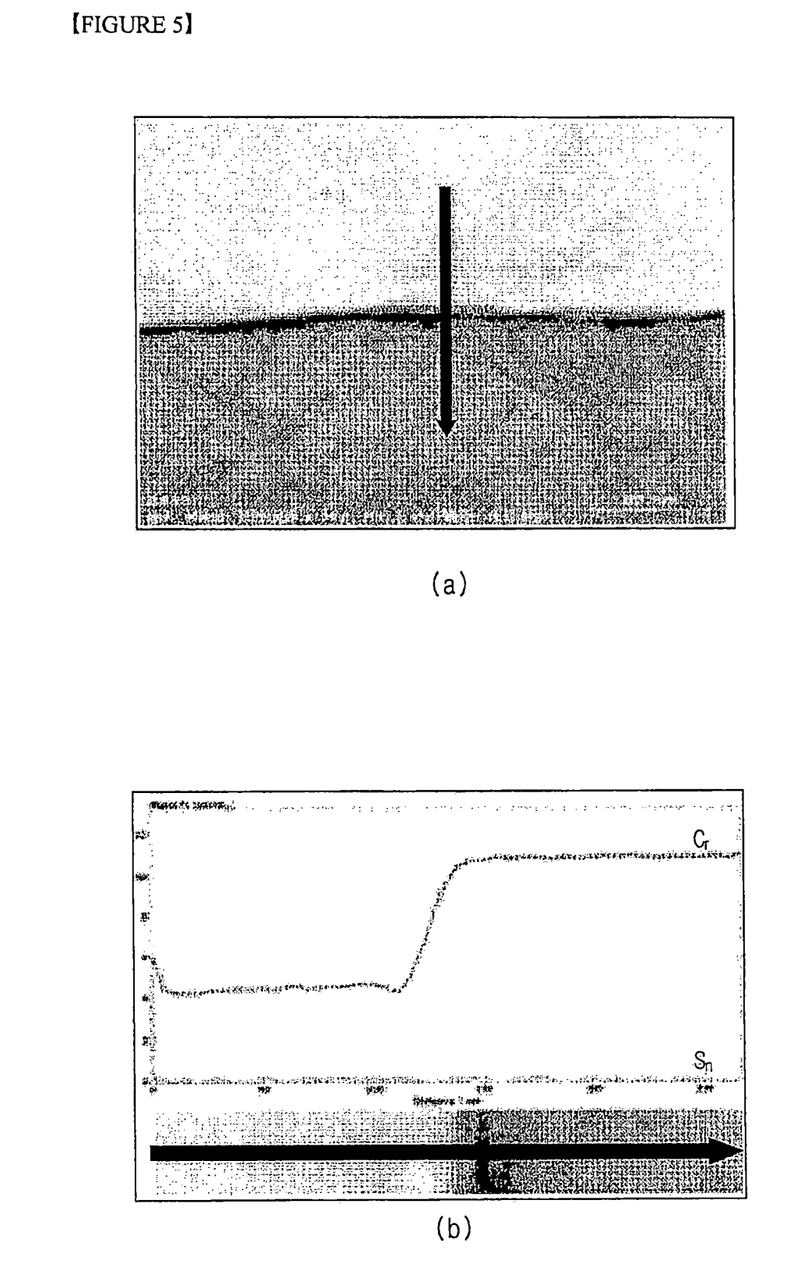
FIG. 5 is a drawing showing the results of the line analysis by transmission electron microscopy (TEM) and EDS (Energy-Dispersive Spectroscopy) from the Al-plated layer of the Sn-free stainless steel to the base material.
Figure 6:
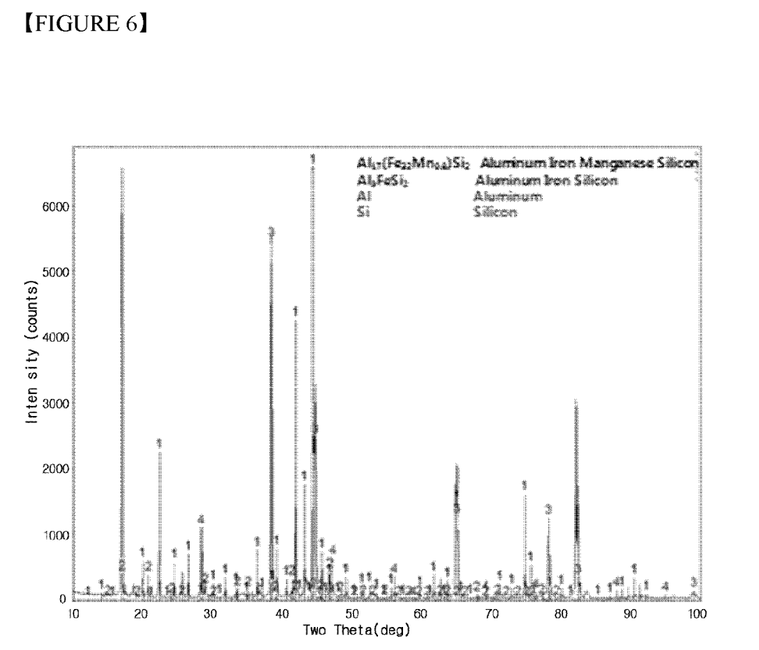
FIG. 6 is a graph showing the results of the X-ray diffraction (XRD) analysis of the interface between the Al-plated layer of the Sn-free stainless steel and the stainless steel base material.

FIG. 5 is a drawing showing the results of the line analysis by transmission electron microscopy (TEM) and EDS (Energy-Dispersive Spectroscopy) from the Al-plated layer of the Sn-free stainless steel to the base material. FIG. 6 is a graph showing the results of the X-ray diffraction (XRD) analysis of the interface between the Al-plated layer of the Sn-free stainless steel and the stainless steel base material.

Referring to FIG. 5, when Cr and Sn were measured from the plated layer toward the base material of the Sn-free stainless steel, it was confirmed that Sn was not concentrated on the surface of the stainless steel base material.

Referring to FIG. 6, the ferritic stainless steel comprises a plating compound comprising $Al_{1.7}(Fe_{32}Mn_{0.8})Si_2$ (Aluminum Iron Manganese Silicon), $Al_9FeSi_2$ (Aluminum Iron Silicon), $Al_3FeSi_2$ (Aluminum Iron Silicon), and Al (Aluminum) at the interface between the stainless steel base material and the Al-plated layer. That is, it can be confirmed that the plating compound of $(Al_{19}FeMnSi_2)_{5.31}$ (Aluminum Iron Manganese Silicide) formed in the Sn-added steel is not formed.

Tables 3 to 5 show the results of measurement of whiteness before and after a heat treatment of the stainless steel of Inventive Steel 3 to which Sn was added and the stainless steel of Comparative Steel 1 to which no Sn was added.

Experimental Example 1

The stainless steel of Inventive Steel 3 and the stainless steel of Comparative Steel 1 were heat-treated at 350° C. for 24 hours, and the whiteness before and after the heat treatment was measured and is shown in Table 3.

TABLE 3

|  | Whiteness before heat treatment | Whiteness after heat treatment | Chrominance(ΔE) |
| --- | --- | --- | --- |
| Inventive Steel 3 | 77.84 | 78.04 | 7.11 |
| Comparative Steel 1 | 78.27 | 71.52 | 10.83 |

Experimental Example 2

The stainless steel of Inventive Steel 3 and the stainless steel of Comparative Steel 1 were heat-treated at 400° C. for 24 hours, and the whiteness before and after the heat treatment was measured and is shown in Table 4.

TABLE 4

|  | Whiteness before heat treatment | Whiteness after heat treatment | Chrominance(ΔE) |
| --- | --- | --- | --- |
| Inventive Steel 3 | 77.93 | 80.04 | 5.70 |
| Comparative Steel 1 | 77.27 | 68.97 | 13.59 |

Experimental Example 3

The stainless steel of Inventive Steel 3 and the stainless steel of Comparative Steel 1 were heat-treated at 450° C. for 24 hours, and the whiteness before and after the heat treatment was measured and is shown in Table 5.

TABLE 5

|  | Whiteness before heat treatment | Whiteness after heat treatment | Chrominance(ΔE) |
| --- | --- | --- | --- |
| Inventive Steel 3 | 78.95 | 79.50 | 5.38 |
| Comparative Steel 1 | 77.59 | 65.80 | 15.35 |

Figure 7:
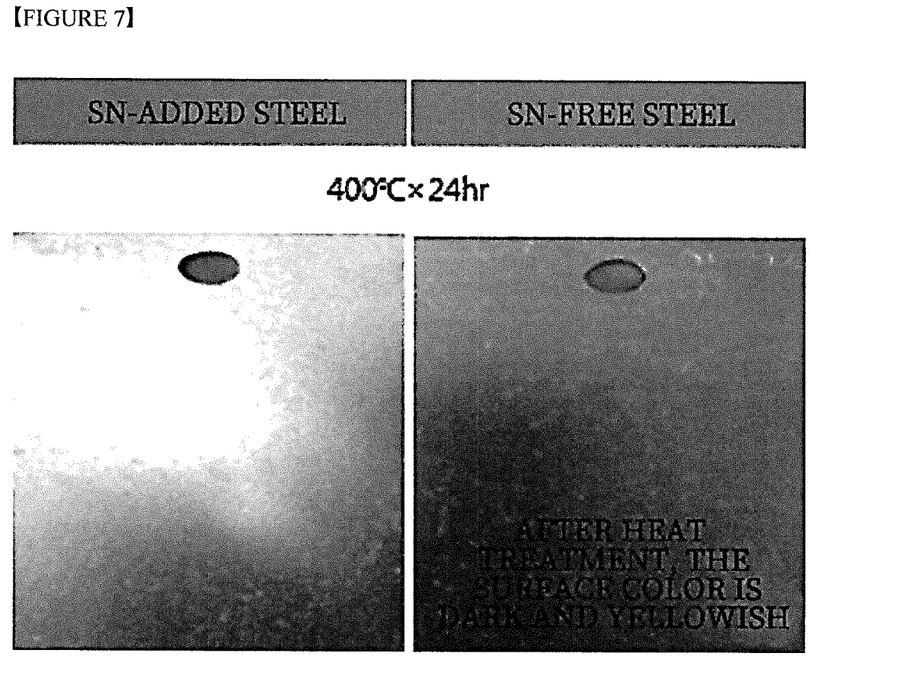
FIGS. 7 and 8 are photographs showing the Sn-added stainless steel of the present invention and the Sn-free stainless steel before and after a heat treatment
Figure 8:
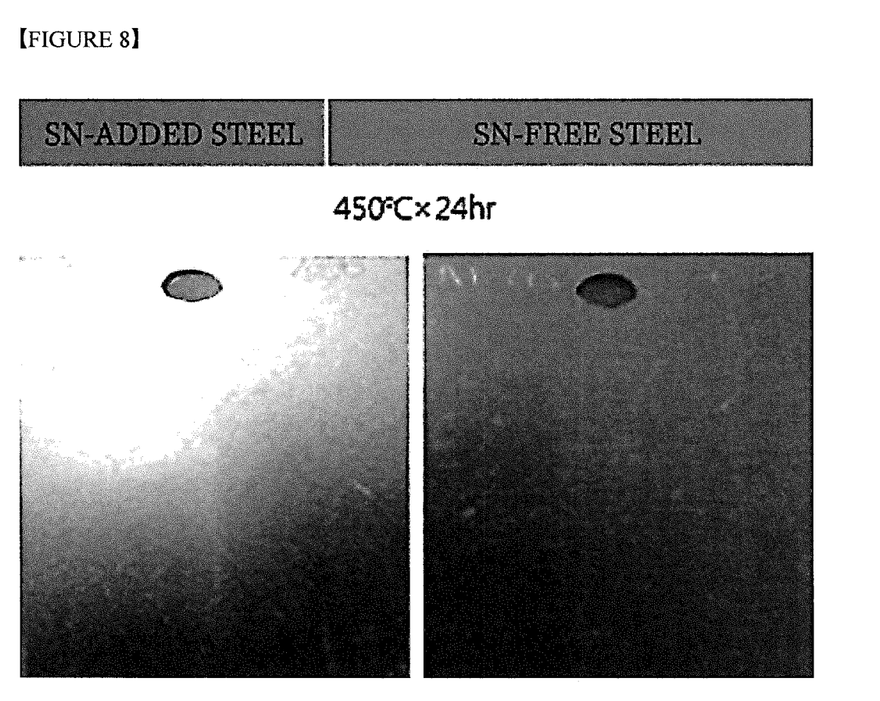

FIGS. 7 and 8 are photographs showing the Sn-added stainless steel of the present invention and the Sn-free stainless steel before and after a heat treatment.

FIG. 7 is a photograph of the surface of the stainless steel according to Experimental Example 2, and FIG. 8 is a photograph of the surface of the stainless steel according to Experiment Example 3.

Referring to the Experimental Examples, FIGS. 7 and 8, the color of the surface of the steel becomes darker and the whiteness is lowered after the heat treatment in the case of the Sn-free steel, but the whiteness does not decrease even when the heat treatment is performed in the case of Sn-added steel, for example, the difference in whiteness is 10 or less. As a result, it can be confirmed that the Sn-added steel is superior in heat resistance to the Sn-free steel.

The corrosion resistance was evaluated according to Japanese standard JASO-B M611-92 for condensate corrosion resistance.

That is, the maximum pitting corrosion depth was measured after repeating a cycle 4 times, and the cycle includes holding the mixture at 80° C. for 24 hours in an aqueous solution having a $Cl^-$ concentration: 100 ppm, a $NO_3^-$ concentration: 20 ppm, a $SO_3^{2-}$ concentration: 600 ppm, a $SO_4^{2-}$ concentration: 600 ppm, a $CH_3COO^-$ concentration: 800 ppm, and a pH of 8.0±0.2 for 5 times, and then holding the mixture at 250° C. for 24 hours.

That is, the solution was maintained at 80° C. for 24 hours in an aqueous solution having a $Cl^-$ concentration: 100 ppm, a $NO_3^-$ concentration: 20 ppm, a $SO_3^{2-}$ concentration: 600 ppm, a $SO_4^{2-}$ concentration: 600 ppm, a $CH_3COO^-$ concentration: 800 ppm, and a pH of 8.0±0.2. The maximum formal depth was measured after repeating a total of 4 cycles with one cycle maintained at 250° C. for 24 hours.

The corrosion resistance of the stainless steels according to Inventive Steel 3 and Comparative Steel 1 was evaluated according to the above method, and the maximum pitting corrosion depth was measured and is shown in Table 6.

TABLE 6

|  | Maximum pitting corrosion depth (mm) |
| --- | --- |
| Inventive Steel 3 | 0.35 |
| Comparative Steel 1 | 0.66 |

FIG. 1 is a graph showing a maximum pitting corrosion depth of a Sn-added stainless steel of the present invention and a Sn-free stainless steel in a condensate solution of an automotive exhaust system.

The embodiment of FIG. 1 is a Sn-added ferritic stainless steel of Inventive Steel 3, and a comparative example is a conventional Al-plated 409L steel of Comparative Steel 1.

Referring to FIG. 1 and Table 6, Inventive Steel 3 has a maximum pitting corrosion depth of 0.35 mm and Comparative Steel 1 has 0.66 mm when evaluating condensate corrosion characteristics (JASO-B M611-92).

As a result, Sn-added Al-plated ferritic stainless steels according to embodiments of the present invention have excellent condensate corrosion resistance and heat resistance.

As described above, while the present invention has been described with reference to exemplary embodiments of the present invention, the present invention is not limited thereto, and it will be understood by those of ordinary skill in the art that various modifications and alternations can be made without departing from the concept and scope of the accompanying claims.

INDUSTRIAL APPLICABILITY

Ferritic stainless steel according to the embodiments of the present invention is excellent in heat resistance and condensate corrosion resistance without adding expensive elements such as Cr and Mo, and may be applied to an automotive exhaust system.

The invention claimed is:

1. A ferritic stainless steel for automotive exhaust systems, comprising: a stainless steel base material comprising, in % by weight, C: 0.01% or less, Si: 0.5 to 1.0%, Mn: 0.5% or less, P: 0.035% or less, S: 0.01% or less, Cr: 11 to 18%, N: 0.013% or less, Ti: 0.15 to 0.5%, Sn: 0.03 to 0.5%, and the remainder of Fe and other inevitable impurities, and an Al-plated layer formed on the stainless steel base material, wherein the ferritic stainless steel comprises a plating compound comprising Aluminum Iron Manganese Silicide at an interface between the stainless steel base material and the Al-plated layer, wherein a chrominance ($\Delta E$) of a surface of the stainless steel before and after a heat treatment is 10 or less, wherein a content of the Sn is concentrated on a surface of the stainless steel base material adjacent to the Al-plated layer by 4.5 to 6.1 times as compared to the stainless steel base material.

2. The ferritic stainless steel according to claim 1, wherein the plating compound further comprises at least one selected from a group consisting of $Al_9FeSi_2$ (Aluminum Iron Silicon), $Al_3FeSi_2$ (Aluminum Iron Silicon), and Al (Aluminum).

3. The ferritic stainless steel according to claim 1, comprising Sn: 0.05 to 0.5%.

4. The ferritic stainless steel according to claim 1, having a maximum pitting corrosion depth of less than 0.4 mm in the evaluation of condensate corrosion characteristics (JASO-B M611-92).

5. A method for manufacturing a ferritic stainless steel for automotive exhaust systems with improved heat resistance and condensate corrosion resistance according to claim 1, comprising:
   hot-rolling a ferritic stainless steel slab comprising, in % by weight, C: 0.01% or less, Si: 0.5 to 1.0%, Mn: 0.5% or less, P: 0.035% or less, S: 0.01% or less, Cr: 11 to 18%, N: 0.013% or less, Ti: 0.15 to 0.5%, Sn: 0.03 to 0.5%, and the remainder of Fe and other inevitable impurities;
   cold-rolling the hot-rolled steel plate; and
   aluminum-plating the cold-rolled steel plate.

6. The method according to claim 5, wherein the ferritic stainless steel is manufactured by a conventional STS 409L manufacturing process.

7. The method according to claim 5, further comprising heat-treating the aluminum-plated ferritic stainless steel at a temperature of 300 to 500° C. within 48 hours,
   wherein a chrominance ($\Delta E$) of a surface of the stainless steel before and after the heat treatment is 10 or less.

* * * * *